Aug. 23, 1927.
E. S. MacPHERSON
1,639,779
PUMP
Filed July 14, 1924
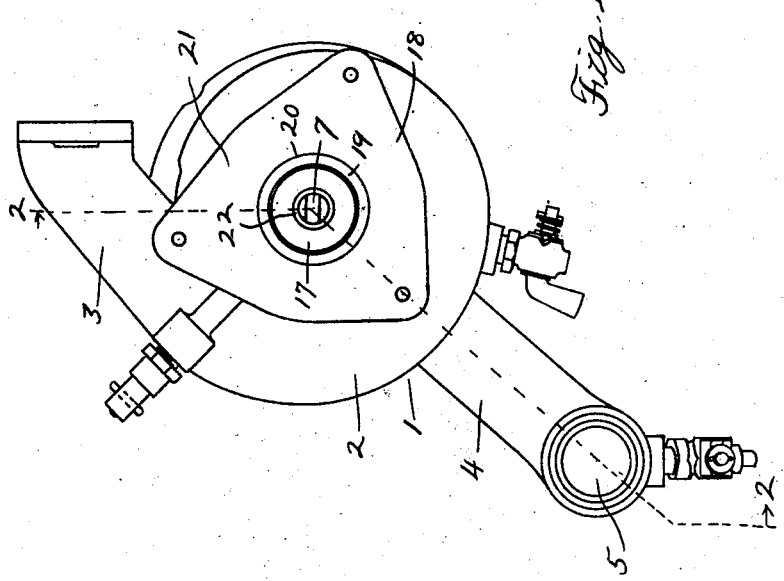
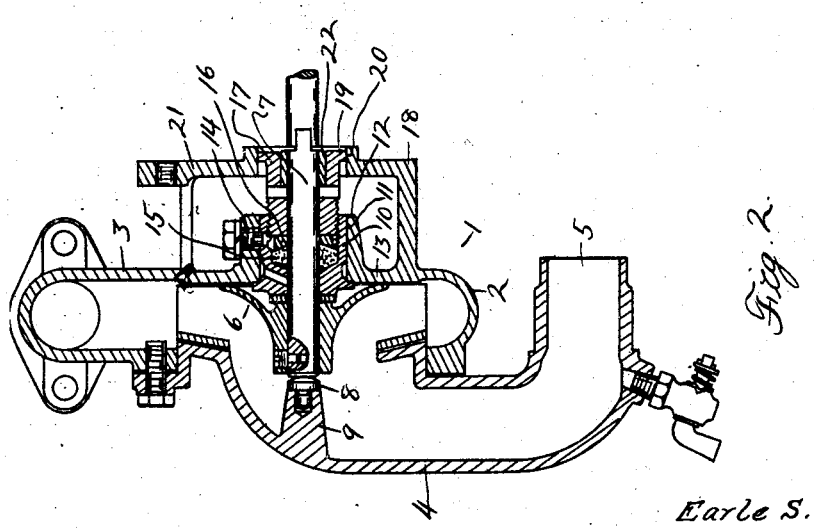
Inventor
Earle S. MacPherson
By Whittemore Hulbert Whittemore
+Belknap Attorneys Patented Aug. 23, 1927.

1,639,779

UNITED STATES PATENT OFFICE.

EARLE S. MacPHERSON, OF DETROIT, MICHIGAN, ASSIGNOR TO HUPP MOTOR CAR CORPORATION, OF DETROIT, MICHIGAN, A CORPORATION OF VIRGINIA.

PUMP.

Application filed July 14, 1924. Serial No. 725,976.

The invention relates to pumps and refers more particularly to water pumps designed to effect the circulation of the cooling water of an internal combustion engine. The invention has for one of its objects the provision of an improved bearing arrangement for the rotor shaft by means of which the length of the pump may be decreased. With this, as well as other objects in view, the invention resides in the novel features of construction and combinations and arrangements of parts as more fully hereinafter set forth.

In the drawings:

Figure 1 is an end view of a pump embodying my invention;

Figure 2 is a cross section on the line 2—2 of Figure 1.

1 is the body of the pump having the annular portion 2 with the outlet 3, the front central portion of the body being open. 4 is the cover for the central front portion secured to the body and having the inlet 5. 6 is the rotor mounted upon the shaft 7 and located within the annular portion 2 of the body. The cover 4 is provided with the button 8 in its inwardly extending lug 9 which button forms an abutment for the inner end of the shaft 7.

The shaft 7 extends through and is journaled in the stuffing box body 10 which is adjacent to the hub of the rotor 6. This body 10 is cup shaped and fits in the aperture 11 formed by the cylindrical flange 12 upon the partition wall 13 of the body 1. 14 is a cap bolt for securing the stuffing box body in place. 15 is the packing within this body and surrounding the shaft 7, and 16 is the gland of the stuffing box for compressing the packing therewithin.

17 is a nut threadedly engaging within the stuffing box body 10 and abutting the gland 16 to move the same axially inward of the shaft 7. This nut is insertable axially inward of the shaft 7 within the extension 18 of the body 1 and has at its outer end the cylindrical flange 19 which fits within the aperture 20 formed in the rear end wall 21 of the extension in axial alignment with the aperture 11. The nut forms a bearing for the rear end of the shaft 7 and as shown is provided preferably with the bushing 22 fitted in its rear portion and in which the rear end of the shaft 7 is journaled.

By reason of having the bearing for the rear end of the shaft 7 located within the body 1 of the pump the total length of the pump is decreased and the pump made more compact. Furthermore this bearing also serves to compress the packing in the stuffing box.

What I claim as my invention is:

1. In a pump, the combination with the body having spaced inner and outer walls provided with aligned openings and a rotor shaft extending through said openings, of packing within the opening of said inner wall and surrounding said shaft, and a nut having an inner portion carried by said inner wall and an outer portion fitting in the opening in said outer wall, said nut being insertable through the opening in said outer wall and forming a bearing substantially in the plane of said outer wall in which said shaft is journaled.

2. In a pump, the combination with the body having spaced inner and outer walls provided with aligned openings and a rotor shaft extending through the openings, of a stuffing box upon said inner wall, packing within said stuffing box and a nut insertable axially of said shaft and having an inner end threadedly engaging said stuffing box, and an outer end fitting in the opening of said outer wall, said nut forming a bearing in substantial alignment with said outer wall in which said shaft is journaled.

3. In a pump for effecting the circulation of cooling water of internal combustion engines, the combination with a body having spaced inner and outer walls provided with aligned openings, a rotor shaft extending through said openings, a stuffing box body surrounding the rotor shaft within the opening provided by the forward inner wall, packing within the stuffing box body and surrounding the rotor shaft, a gland also within the stuffing box body and engageable within the stuffing box body and a nut having an inner portion threadedly engaging the stuffing box and an outer portion fitting in the opening provided by the said outer wall, said nut being insertable through the opening in said outer wall and forming a bearing for the said rotor shaft.

4. In a pump for effecting the circulation of cooling water of internal combustion engines, the combination with a body having spaced inner and outer walls provided with aligned openings, a rotor shaft extending through said openings, a stuffing box body surrounding the rotor shaft within the opening provided by the said inner wall, packing within the stuffing box body and surrounding the rotor shaft, a gland also within the stuffing box body and engageable with the packing, and a nut having an inner portion threadedly engageable within the stuffing box body and an outer portion fitting in the opening provided by the said outer wall and forming with the said stuffing box body a pair of bearings within the pump body spaced longitudinally of the rotor shaft whereby the total length of the pump is made relatively small.

5. In a pump for effecting the circulation of cooling water of internal combustion engines, the combination with a body having spaced inner and outer walls provided with aligned openings, a rotor shaft extending through said openings, a stuffing box body surrounding the rotor shaft within the opening provided by the said inner wall, packing within the stuffing box body and surrounding the rotor shaft, a gland also within the stuffing box body and engageable with the packing, and a nut having an inner portion threadedly engageable within the stuffing box body and an outer portion fitting in the opening provided by the said outer wall and forming with the said stuffing box body a pair of bearings within the pump body spaced longitudinally of the rotor shaft whereby the total length of the pump is made relatively small, said nut forming its bearings substantially in the plane of said outer wall in which said rotor shaft is journaled.

6. In a pump, the combination with a body having spaced inner and outer walls provided with aligned openings and a rotor shaft extending through the openings, of a cylindrical flange surrounding the opening in the inner wall, a stuffing box within said cylindrical flange, packing within said stuffing box and a member insertable axially of said shaft and having an inner end threadedly engaging said stuffing box, and an outer end fitting in the opening of the outer wall, said member forming a bearing in substantial alignment with the outer wall in which the shaft is journaled.

In testimony whereof I affix my signature.

EARLE S. MacPHERSON.